(12) United States Patent
Maijala et al.

(10) Patent No.: US 9,327,992 B2
(45) Date of Patent: May 3, 2016

(54) PIGMENT PARTICLE COMPOSITION, ITS METHOD OF MANUFACTURE AND ITS USE

(75) Inventors: Mikko Maijala, Espoo (FI); Roope Maijala, Espoo (FI)

(73) Assignee: FP-Pigments Oy, Espoo (FI)

( * ) Notice: Subject to any disclaimer, the term of this patent is extended or adjusted under 35 U.S.C. 154(b) by 1013 days.

(21) Appl. No.: 12/921,214

(22) PCT Filed: Mar. 9, 2009

(86) PCT No.: PCT/FI2009/050187
§ 371 (c)(1),
(2), (4) Date: Oct. 8, 2010

(87) PCT Pub. No.: WO2009/109705
PCT Pub. Date: Sep. 11, 2009

(65) Prior Publication Data
US 2011/0011305 A1    Jan. 20, 2011

(30) Foreign Application Priority Data

Mar. 7, 2008  (FI) .................................... 20085213

(51) Int. Cl.
*C09C 1/02* (2006.01)
*C09C 1/36* (2006.01)
(Continued)

(52) U.S. Cl.
CPC .............. *C01F 11/181* (2013.01); *B82Y 30/00* (2013.01); *C09C 1/0084* (2013.01); *C09C 1/021* (2013.01);
(Continued)

(58) Field of Classification Search
CPC ... B82Y 30/00; C01F 11/181; C01P 2004/45; C08K 3/26; C09C 1/0084; C09C 1/021; C09C 1/3653; C09D 11/037; C09D 17/004; C09D 7/1216; C09D 7/1266; C09D 7/1275; D21H 17/675; D21H 19/38; D21H 19/03

USPC .................................. 106/449, 463, 464, 436
See application file for complete search history.

(56) References Cited

U.S. PATENT DOCUMENTS 6,143,064 A * 11/2000 Virtanen ........................ 106/449
6,416,727 B1 * 7/2002 Virtanen ........................ 423/432
(Continued)

FOREIGN PATENT DOCUMENTS

EP   0768344 A2   4/1997
EP   1 323 674 A1   7/2003
(Continued)

OTHER PUBLICATIONS

International Search Report for Serial No. PCT/FI2009/050187 dated Jul. 29, 2009.

*Primary Examiner* — Shuangyi Abu Ali
(74) *Attorney, Agent, or Firm* — McCormick, Paulding & Huber LLP

(57) ABSTRACT

A pigment particle composition which comprises calcium carbonate particles and pigment particles, its method of manufacture and its use. According to the present invention, the calcium carbonate particles are carbonated so that they bind to each other, in which case calcium carbonate structures are generated, which comprise pigment particles and which form essentially opaque and stable pigment-calcium carbonate aggregates. It is possible to manufacture the composition by atomizing calcium hydroxide-bearing pigment slurry into a carbon dioxide-bearing gas, in which case the calcium hydroxide is carbonated in order to precipitate the calcium hydroxide particles to be attached to each other and the carbonation is continued until essentially all of the calcium hydroxide has been converted into calcium carbonate. The composition is suitable for use, among others, in paints, coating materials, fillers, polymers and printing inks.

16 Claims, 6 Drawing Sheets

(51) Int. Cl.
  *C08K 3/26* (2006.01)
  *C08K 3/22* (2006.01)
  *C08K 3/30* (2006.01)
  *C09D 11/02* (2014.01)
  *D21H 17/63* (2006.01)
  *C01F 11/18* (2006.01)
  *B82Y 30/00* (2011.01)
  *C09C 1/00* (2006.01)
  *C09D 7/12* (2006.01)
  *C09D 11/037* (2014.01)
  *C09D 17/00* (2006.01)
  *D21H 17/67* (2006.01)
  *D21H 19/38* (2006.01)

(52) U.S. Cl.
  CPC ............ *C09C 1/3653* (2013.01); *C09D 7/1216* (2013.01); *C09D 7/1266* (2013.01); *C09D 7/1275* (2013.01); *C09D 11/037* (2013.01); *C09D 17/004* (2013.01); *D21H 17/675* (2013.01); *D21H 19/38* (2013.01); *D21H 19/385* (2013.01); *C01P 2004/03* (2013.01); *C01P 2004/30* (2013.01); *C01P 2004/45* (2013.01); *C01P 2004/62* (2013.01); *C01P 2004/64* (2013.01); *C08K 3/26* (2013.01)

(56) References Cited

U.S. PATENT DOCUMENTS

| | | | |
|---|---|---|---|
| 6,743,286 | B2 | 6/2004 | Wen et al. |
| 6,991,677 | B2 * | 1/2006 | Tanabe et al. ............... 106/436 |
| 2003/0024437 | A1 | 2/2003 | Wen et al. |
| 2006/0102304 | A1 * | 5/2006 | Nutbeem et al. ............ 162/135 |

FOREIGN PATENT DOCUMENTS

| | | |
|---|---|---|
| EP | 1340795 A1 | 9/2003 |
| WO | 97/18268 A1 | 5/1997 |
| WO | 98/16471 A1 | 10/1997 |
| WO | 98/41475 A1 | 9/1998 |

\* cited by examiner

PIGMENT PARTICLE COMPOSITION, ITS METHOD OF MANUFACTURE AND ITS USE

CROSS REFERENCE TO RELATED APPLICATIONS

This application is entitled to the benefit of and incorporates by reference essential subject matter disclosed in International Patent Application No. PCT/FI2009/050187 filed on Mar. 9, 2009 and Finnish Patent Application No. 20085213 filed Mar. 7, 2008.

FIELD OF THE INVENTION

The present invention relates to a pigment particle composition.

BACKGROUND OF THE INVENTION

A composition like this generally comprises calcium carbonate particles and pigment particles.

The present invention also relates to a method of manufacturing a pigment particle composition, and also to paint, coating material, filling material, polymer and printing ink compositions.

Because of its high refractive index, titanium dioxide is used as a light-scattering white pigment in paints, printing inks and many other coating compositions, and also in filling materials.

Titanium dioxide is expensive and difficult to recycle. In order to reduce the quantities required, titanium dioxide is typically mixed with extenders, but it is necessary to keep the amounts of extender very small, otherwise the optical properties which are achieved with titanium dioxide are lost, especially the opacity achieved, which is critically important in particular for paints and coating compositions, and for filling materials, too.

SUMMARY OF THE INVENTION

It is an aim of the present invention to eliminate the disadvantages associated with the known technology and to generate completely new pigment compositions, in which it is possible to reduce the amount of the light-scattering pigment, without degrading the achieved optical properties, particularly the opacity.

The present invention is based on the idea that a shell which comprises precipitated calcium carbonate particles is formed around the pigment particles, which shell at least partly encases one or several pigment particles.

In this case, according to the present invention, the calcium carbonate particles are at least mainly carbonated so that they bind to each other to form calcium carbonate structures. These structures comprise one or several particles, but generally only one or two pigment particles, which together with the calcium carbonate form essentially opaque and stable pigment-calcium carbonate aggregates.

It is possible to manufacture such compositions for instance by atomizing a calcium hydroxide-bearing aqueous slurry which comprises pigment particles into a carbon dioxide-bearing gas, in order to carbonate the calcium hydroxide;

by choosing the amount of the calcium hydroxide in the aqueous slurry in such a way that the calcium carbonate percentage in the pigment composition is equivalent to a predefined weight percentage;

by carbonating the calcium hydroxide in order to carbonate the calcium carbonate particles to be attached to each other; and by continuing the carbonation until essentially all the calcium hydroxide has been converted into calcium carbonate.

It is possible to use the composition according to the present invention as a pigment in paints, in coating material compositions in paper or cardboard, in filling material compositions in paper or cardboard, in plastics or in printing inks.

More specifically, the composition according to the present invention is such that at least part of the calcium carbonate particles are carbonated so that they bind to each other to form calcium carbonate structures which comprise at least one pigment particle and which calcium carbonate structures, together with the pigment particles, form essentially opaque and stable pigment-calcium carbonate aggregates.

The method according to the present invention is, in turn, characterized in that the calcium dioxide-bearing aqueous slurry which comprises pigment particles is atomized into calcium dioxide-bearing gas in order to carbonate the calcium hydroxide, and in turn to generate a pigment composition which comprises calcium carbonate, the amount of calcium hydroxide in the aqueous slurry is chosen in such a way that the percentage of calcium carbonate in the pigment composition is equivalent to a predefined weight percentage, and the calcium hydroxide is carbonated in order to precipitate the calcium carbonate particles which are to be attached to each other, and the carbonation is continued until essentially all of the calcium hydroxide has been converted into calcium carbonate, and the paint, coating material, filling material, polymer and printing ink compositions according to the present invention are characterized in that at least 1 weight-% of the pigment comprises compositions as stated above.

The usage according to the present invention is as a pigment in paint, in coating material composition in paper or cardboard, in filler composition in paper or cardboard, in plastic or in printing ink.

Considerable advantages can be achieved with the present invention. Thus, an excellent opacity is achieved by means of this pigment composition, and also it is possible to use it as a substitute for more than 50 weight-% of the white pigment of the titanium dioxide in for instance a paint composition.

We have discovered that when the pigment particles are titanium dioxide, the opacity which can be achieved by applying the calcium carbonate modification is, already at weight ratios of 10:90 . . . 30:70 between titanium dioxide and calcium carbonate, at least nearly as good as with 100% titanium dioxide, in an application where part or all of the titanium dioxide is substituted by calcium carbonate.

The excellent properties of the compositions according to the present invention are mainly a result of the fact that the pigment particles are separated from each other by the calcium carbonate structures in such a way that the distance between them is at least approximately 60 nm, preferably at least approximately 100 nm, most suitably at least approximately 120 nm.

Because the price of calcium carbonate is substantially less than that of titanium dioxide or that of many other light-scattering pigment particles, the present invention offers a significant reduction in pigment costs.

With particular regard to titanium dioxide, it is important to note that in the market of white covering pigments there is no real substitute for it (i.e. titanium dioxide) However, the drawback with titanium dioxide is its tendency to agglomerate, in which case its light-scattering power drops significantly. Another advantage of the present invention is that we have now found a way of efficiently utilizing the high refractive index (light-scattering index) of titanium. In the manufacturing of the shell according to the present invention it is possible to use very cost-effective materials, namely calcium oxide/calcium hydroxide and carbon dioxide to substitute for the expensive titanium dioxide.

Another problem associated with titanium dioxide in paper and cardboard applications is that its retention quality is often poor, which characteristic is improved by using the product according to the present invention, because this product has a larger particle size and a lower density than titanium dioxide. Larger and lighter particles are more readily retained in the fibre network, and are not removed along with the water (mechanical retention).

The manufacturing method is simple and industrially useful: it is very fast, and being a carbonating process it is very efficient. The generation of the carbonate shell takes place in-situ, in which case a separate manufacturing of PCC is not needed.

The method can be applied at an industrial scale. According to a preferred embodiment of the present invention, the manufacturing of a pigment composition is carried out continuously.

BRIEF DESCRIPTION OF THE DRAWINGS

In the following, the present invention is examined more closely with the help of a detailed explanation and the accompanying drawings, where.

DETAILED DESCRIPTION OF THE PREFERRED EMBODIMENTS

Figure 1A:
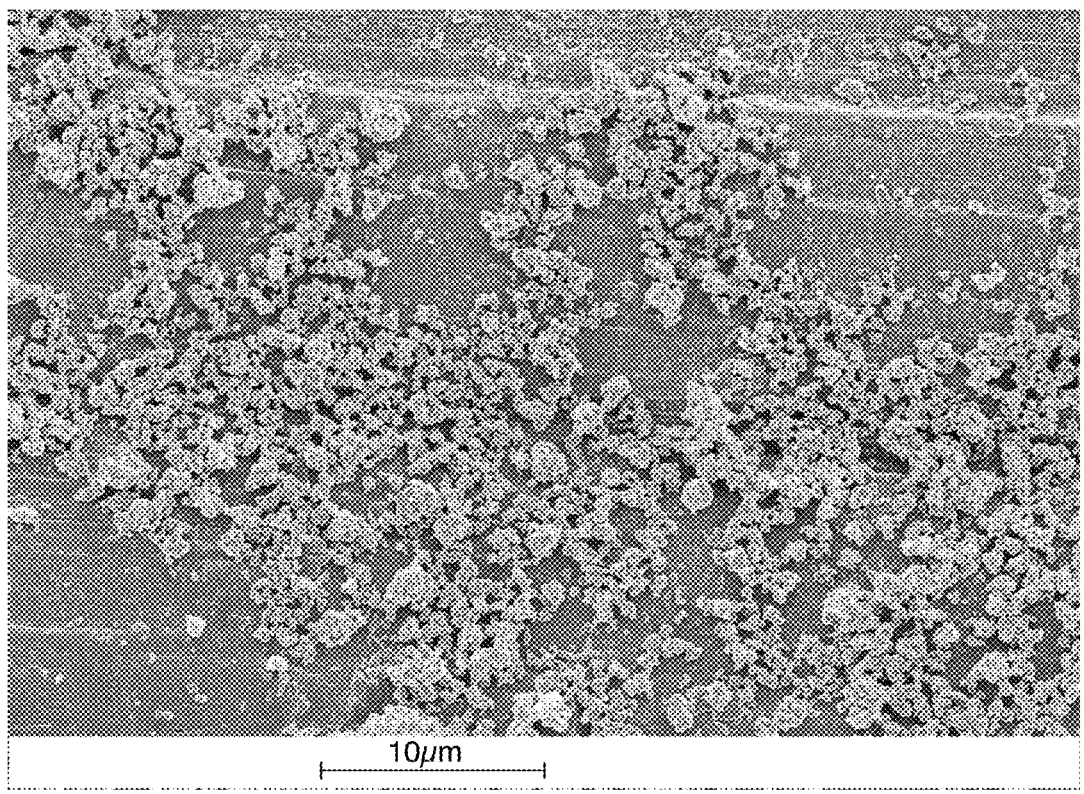
FIGS. 1a and 1b are electron microscopic pictures of a calcium carbonate-pigment particle composition manufactured according to the present invention.
Figure 1B:
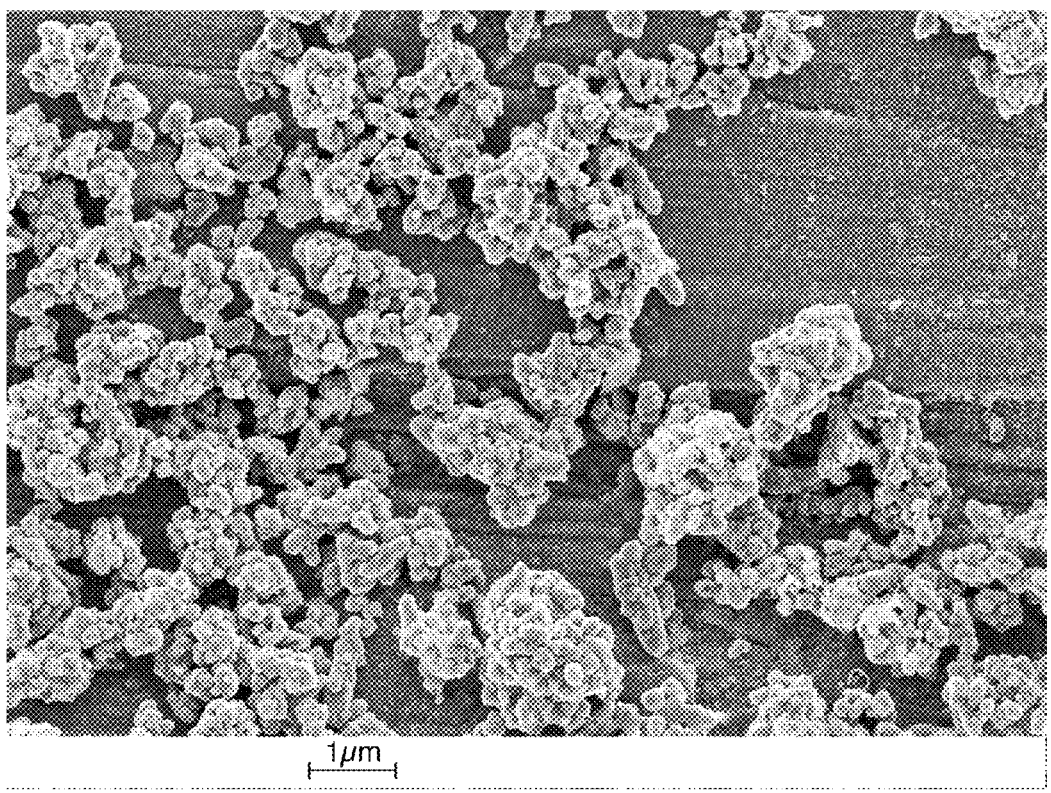

FIGS. 1a and 1b show electron microscopic pictures of a calcium carbonate-pigment product, which is manufactured according to the present invention and which comprises titanium dioxide particles encased by calcium carbonate particles. The calcium carbonate comprises particles which are manufactured from calcium hydroxide by a process of carbonation (i.e. precipitated calcium carbonate, PCC). FIGS. 1a and 1b illustrate how, according to an embodiment of the present invention, the calcium carbonate particles are typically carbonated in order to attach them to each other in such a way that they form a shell which at least partly encases the said, at least one, pigment particle. On the basis of analyses, the thickness of the shell is on average at least approximately 30 nm, especially at least approximately 50 nm, most suitably approximately 60-500 nm.

On the basis of the pictures, the calcium carbonate particles are mainly non-spherical in form. Typically, their external form is at least mainly rhombic or rhombohedric.

The particles are crystalline and their crystal form is mainly calcite or—to a lesser degree—aragonite.

FIGS. 1a and 1b show that the calcium carbonate particles form a polynuclear calcium carbonate structure, to which a pigment particle is attached. Our tests have shown that the calcium carbonate particles and the pigment particles, which in this picture are titanium dioxide particles, are strongly attached to each other. The majority of the calcium carbonate particles (i.e. more than 50%, typically even more than 90 or 95%) remain attached to the calcium carbonate crystals both in the dry pigment composition and in the aqueous slurry of the pigment composition.

The attribute "stable", which is used for the calcium carbonate-pigment aggregate, means that a considerable percentage (at least approximately 50 weight-%, especially approximately 75 weight-%, most suitably at least approximately 90 weight-%) of the pigment particles which are part of the aggregate remain attached to the calcium carbonate particles even though the calcium carbonate-pigment aggregates are dispersed in water and then dried or—vice versa—even though they are dried to powder form and then dispersed in water.

Opaqueness means that the calcium carbonate-pigment aggregation gives, as a pigment, a good opacity to that intermediate agent into which it is mixed when substituting for part or all of the pigment, in the embodiment. Typically, this opacity is of the same magnitude (with a variation range of approximately 10%) as the associated pigment. An excellent opacity is mainly a result of the above-mentioned fact, i.e. that it is possible to keep the pigment particles, which are covered with the shells, at such a distance from each other that it produces optimal opacity, and that the retention of those particles is good and they are evenly distributed in the intermediate agent.

The shell which is formed of the calcium carbonate particles encases, partly or totally, approximately 1-20, especially approximately 1-10, preferably 1-3 pigment particles. In the figure it is difficult to distinguish the individual titanium dioxide particles from the calcium carbonate because the former are completely encased by the latter.

The calcium carbonate structure is formed of calcium carbonate particles, the original size of which, before they are carbonated in order to attach them to other particles, is on average approximately 20-250 nm. When the calcium carbonate particles coalesce, they form an essentially continuous surface.

The weight ratio between the pigment particles and the calcium carbonate particles is approximately 90:10 . . . 5:95, preferably approximately 60:40 . . . 5:95, and especially approximately 40:60 . . . 10:90. The composition according to FIGS. 1a and 1b represents a case in which the amount of titanium dioxide is on average approximately 18 weight-% and the amount of calcium carbonate is on average approximately 82 weight-% of the total amount of the pigment and calcium carbonate.

In the manufacturing, the weight ratio between the light-scattering pigment and the calcium carbonate is adjusted to the desired ratio by choosing the amounts of the calcium hydroxide and calcium carbonate in the aqueous slurry to be carbonated in such a way that the calcium carbonate percentage in the final pigment composition corresponds to a predefined weight percentage.

The pigment compositions may comprise, besides the pigment particles and the calcium carbonate particles, also other elements, such as dispersants, surface modifying agents and stabilising agents or mixtures thereof. However, the total amount of these is at maximum approximately 20 weight-% of the total weight of the composition, typically below 10%.

The composition according to the present invention is typically manufactured

- by atomizing a calcium hydroxide-bearing aqueous slurry which comprises pigment particles into a carbon dioxide-bearing gas, in order to carbonate the calcium hydroxide to generate calcium carbonate, and in turn to generate a pigment composition, and
- by choosing the amount of the calcium hydroxide in the aqueous slurry in such a way that the percentage of the calcium carbonate in the pigment composition corresponds to a predefined weight percentage.

In this method, calcium carbonate particles are precipitated from calcium hydroxide and carbon dioxide in such a way that calcium carbonate particles adhere to the surface of pigment particles and are carbonated in order to attach them to other calcium carbonate particles, in which case essentially opaque and stable pigment-calcium carbonate aggregates are formed, which are at least partly covered with calcium carbonate particles.

Preferably, the calcium hydroxide-bearing aqueous slurry which comprises titanium dioxide particles is at least essentially fibre free, in which case all of the calcium hydroxide to be precipitated is available for the coating of the pigment particles.

The method makes it possible to adjust the weight ratio between the pigment particles and the calcium carbonate to the desired ratio by choosing the amounts of the calcium hydroxide and the calcium carbonate in the aqueous slurry in such a way that the percentage of the calcium carbonate in the final pigment composition corresponds to a predefined weight percentage.

Typically, the calcium hydroxide-bearing aqueous slurry which comprises pigment particles is led through a high energy mixing zone, in which zone the aqueous slurry is broken up into drops or even into nebulous drops, and then dripped into a carbon dioxide-bearing gas. The carbonation is continued until essentially all of the calcium hydroxide has been transformed into calcium carbonate.

FIGS. 1a and 1b show calcium carbonate compositions which comprise titanium dioxide. The crystalline form of the titanium dioxide, in turn, can be rutile or anatase. However, the solution according to the present invention is also suitable for other light-scattering and/or absorbing pigments, such as aluminium hydroxide, barium sulphate, kaolin, gypsum, ground or precipitated calcium carbonate, chalk or mixtures thereof, and also for organic pigment materials, such as plastic pigments and furnace black and mixtures thereof.

In the method according to the present invention, calcium hydroxide-bearing aqueous slurry which comprises pigment particles is dripped into a carbon dioxide-bearing gas in order to carbonate the calcium hydroxide with the purpose of forming a pigment composition which comprises calcium carbonate. The method is preferably carried out in a surplus of carbon dioxide, in which case the formation of calcium carbonate is limited only by the amount of the calcium hydroxide which is fed into the system. In these conditions the carbonation is typically continued until the pH value of the pigment slurry is essentially neutral. There is no need to add any acid.

The processing along with the process equipment are described below in detail with the help of FIGS. 2-6. In general, it can be seen that it is advantageous to carry out the carbonation in several stages. In this case, the aqueous slurry, which is generated by the atomizing of the calcium hydroxide-bearing aqueous slurry into carbon dioxide gas in conjunction with the carbonation, is recovered and is most suitably brought to further carbonation.

According to an embodiment, the aqueous slurry is further carbonated by atomizing it once more into carbon dioxide gas. In another embodiment, it is further carbonated by bubbling carbon dioxide gas into the slurry.

Typically, carbonation is carried out continuously in such a way that the aqueous slurry undergoes at least one atomizing. The light-scattering and calcium hydroxide-bearing aqueous slurry which comprises pigment particles is then led through a high energy mixing zone, in which zone the aqueous slurry is broken up into drops or even into nebulous drops, and then dripped into a carbon dioxide-bearing gas. If necessary, dispersants, surface modifying agents or stabilising agents or mixtures thereof are added to the pigment composition to be manufactured during or after manufacturing.

Essentially, all of the calcium hydroxide-bearing aqueous slurry can be added to the carbonation together with the pigment particles. However, it is also possible to introduce the calcium hydroxide-bearing aqueous slurry into the carbonation gradually and in several batches, in which case most suitably at least part of the calcium hydroxide-bearing aqueous slurry is free of pigments when it is fed into the carbonation.

According to an embodiment, pigment is added little by little and possibly separate from the calcium hydroxide.

The method is typically carried out at temperatures of approximately 30-100° C., especially approximately 50-80° C.

In the following, the applications shown in the drawings will be examined more closely.

Figure 2:
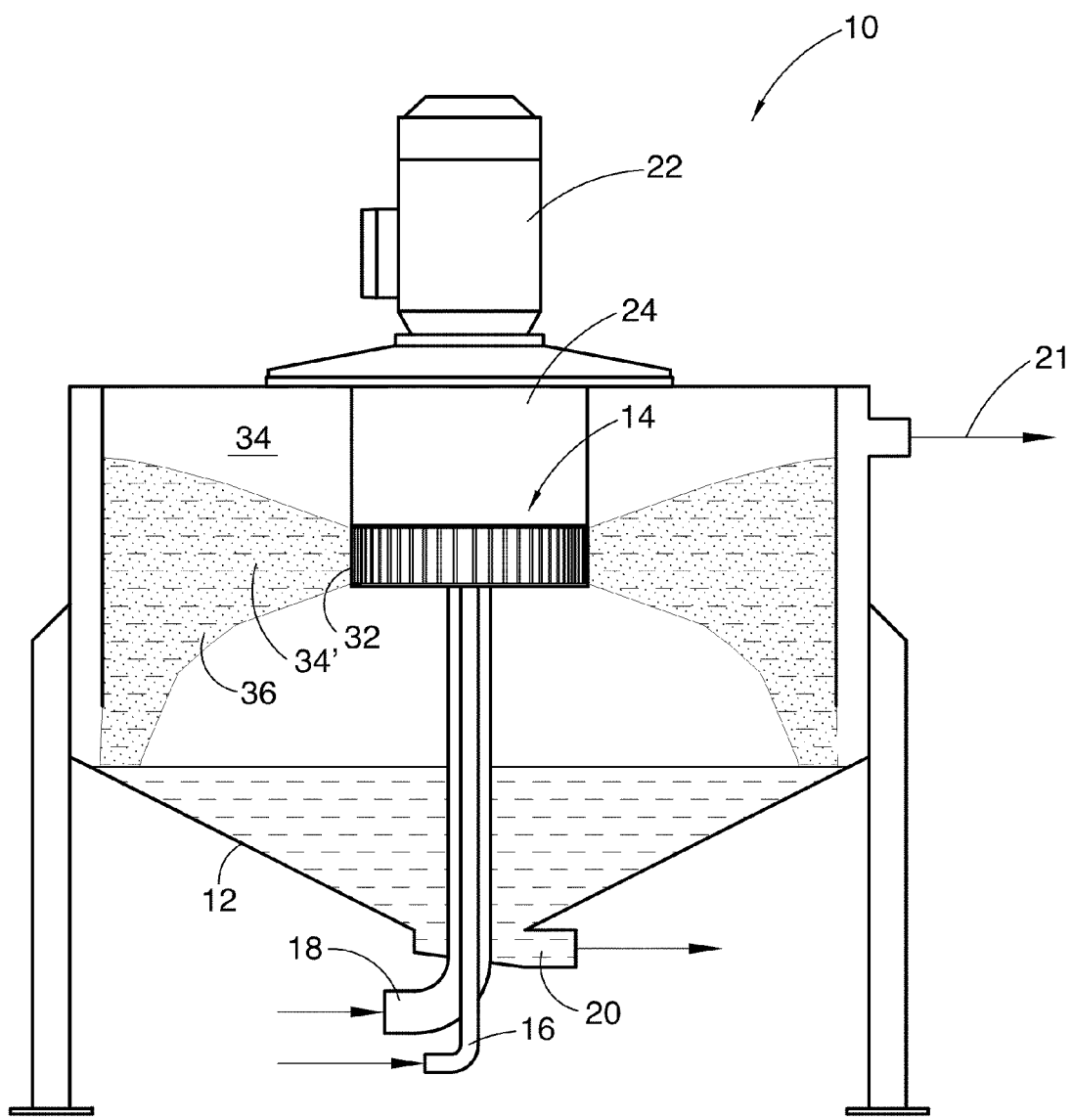
FIG. 2 shows schematically, as an example, a vertical cross-section of one of the precipitation reactors according to the present invention.

FIG. 2 shows a continuously working precipitation reactor (10), according to the present invention, which reactor comprises a precipitation vessel (12), a atomizer (14) fitted into the precipitation vessel, a feed pipe (16) for the calcium hydroxide-bearing aqueous slurry which comprises titanium dioxide particles, an inlet pipe (18) for the precipitating gas, and a discharge pipe (20) for the treated pigment composition. In addition, the equipment comprises an actuator (22), including the bearing and sealing assembly (24) which lie between the actuator (22) and the atomizer (14).

Figure 3:
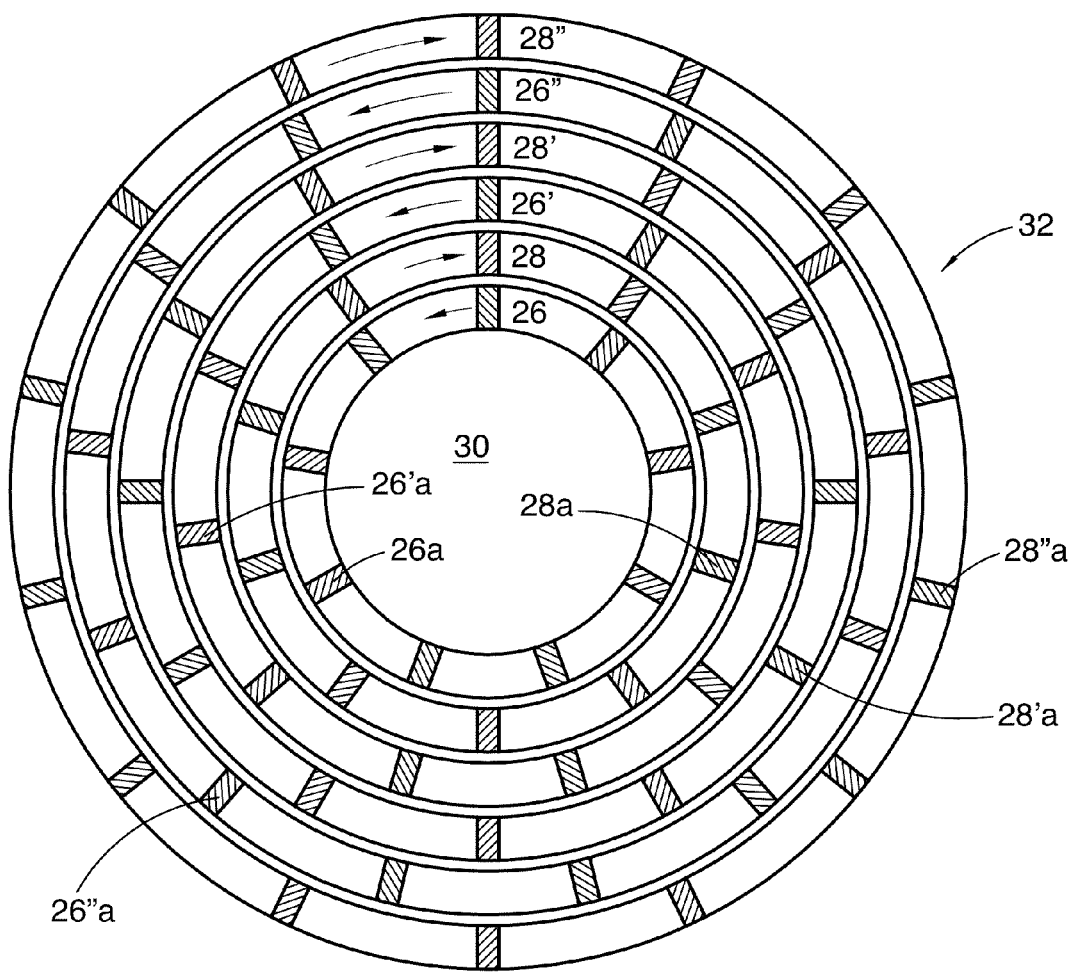
FIG. 3 shows schematically, as an example, a horizontal cross-section of a atomizer which is fitted into the precipitation reactor according to FIG. 2.
Figure 4:
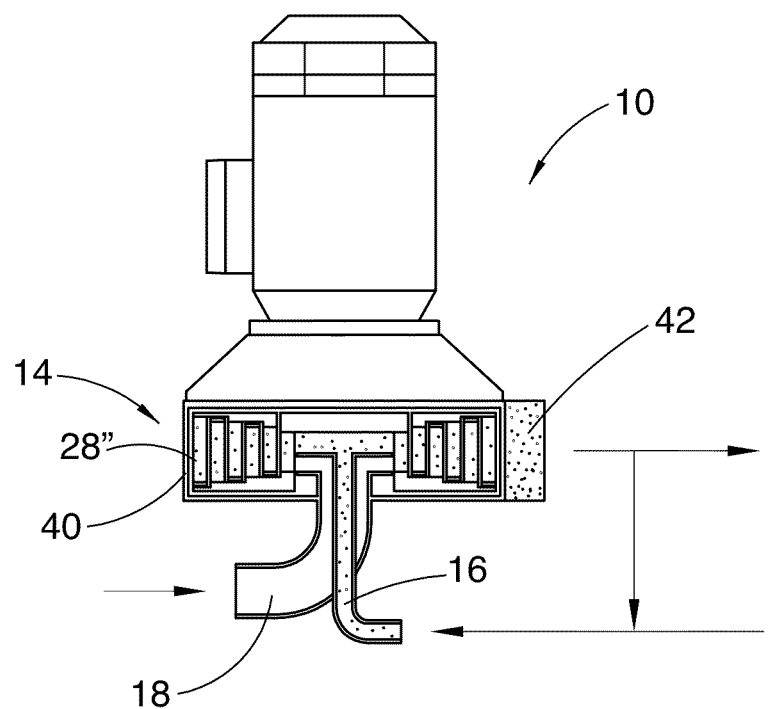
FIG. 4 shows schematically, as an example, a vertical cross-section of the second precipitation reactor according to the present invention.
Figure 5:
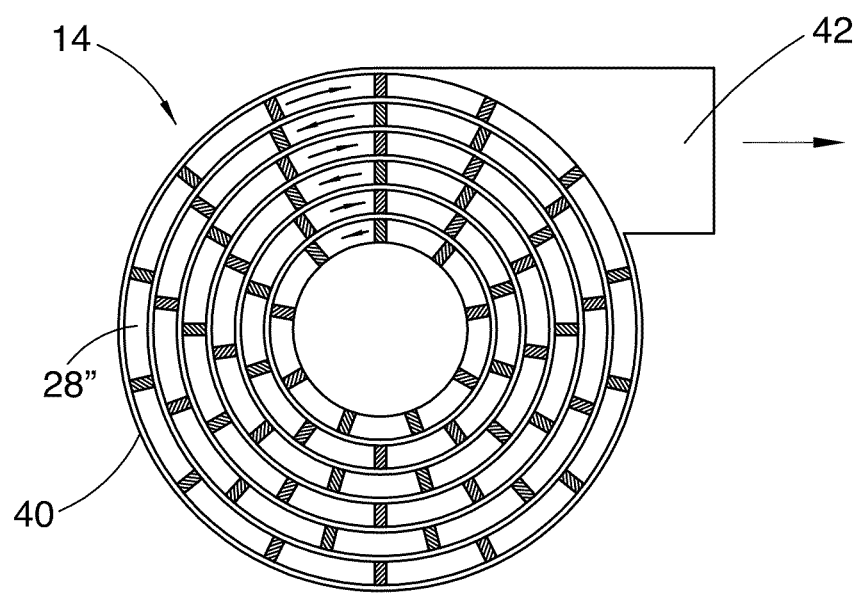
FIG. 5 shows schematically, as an example, a atomizer of the precipitation reactor according to FIG. 4.

The atomizer (14), a horizontal section of which is shown in FIG. 3, is a through-flow mixer which has 6 coaxial rings 26, 26', 26", 28', 28', 28", equipped with blades 26a, 26'a, 26"a, 28a, 28'a, 28"a. In this device (14), the calcium hydroxide-bearing aqueous slurry which comprises titanium dioxide particles is dripped to form small particles, liquid drops and/or particles of solids. The dwell time in the atomizer is short, <10 seconds, typically <2 seconds, most typically even less than 1 second.

As the arrows in FIG. 3 indicate, one set of rings, 26, 26', 26", of the atomizer functions as rotors which, in the case of FIG. 3, rotate counterclockwise. The other set of rings, 28, 28', 28", placed alternately between the rings in the first set, also function as rotors; however, they rotate clockwise in this case. Blades 26a, 26a', 26a" and 28a, 28a', 28a", which are mounted on both sets of rings, encounter the pigment composition travelling outwards and radially through the device, resulting in the composition being exposed to recurrent impacts and double impacts. It is also possible to drip the calcium hydroxide-bearing aqueous slurry which comprises pigment particles, by using equipment having fixed rings, i.e. stators, between each set of clockwise-rotating rings and also between each set of counterclockwise-rotating rings.

The calcium hydroxide-bearing aqueous slurry which comprises titanium dioxide particles is fed through a pipe (16) to the centre (30) of the atomizer, from where it travels, as a result of the movement of the blades of the rotors and the difference in pressure created between the centre and the periphery of the device, radially outwards, towards the open outer edge (32) of the outer ring (28"). This aqueous slurry can be fed into the device (14) in between the rings as well, when necessary. If desired, it is also possible to feed the titanium dioxide particles and the calcium hydroxide-bearing aqueous slurry into the atomizer (14) through separate pipes, in which case the formation of the calcium hydroxide-bearing aqueous slurry which comprises titanium dioxide particles occurs no earlier than at this point.

The impacts and double impacts, the shear forces, the turbulence and the pulses of both underpressure and overpressure which are generated by the movement of the rotor blades rotating in opposite directions, drip the calcium hydroxide-bearing aqueous slurry which comprises titanium dioxide particles into fine fractions, liquid drops and particles of solids. It is also possible to generate the same effect by using rotors which rotate in the same direction but at greatly differing speeds, or by using a rotor-stator combination.

In the solution, according to the present invention, shown in FIGS. 2 and 3, the precipitating gas is directed through the pipe (18) to the centre (30) of the rings of the atomizer. From this centre, the gas flows radially outwards generating, both in the atomizer and in the precipitation vessel (12) around it, a gaseous space (34) comprising the precipitating gas. The gas is discharged through the pipe (21) located on the top section of the precipitation reactor. If desired, it is possible to feed the precipitating gas to the rings and/or in between the rings of the atomizer, too. The precipitation reactions may already begin in the gaseous space of the atomizer.

When treated in the atomizer (14), the calcium hydroxide-bearing aqueous slurry which comprises titanium dioxide particles generates fine drops and particles, which are dispersed from the device (14) into the surrounding section (34') of the gaseous space. The fine drops and particles are forcibly ejected from the atomizer, mainly from its outer ring area, as a nebulous flow (36). Following ejection from the atomizer, the precipitation reactions may continue for a relatively long time while the fine drops and particles disperse widely in the precipitation vessel. The treated fibre composition descends into the pool at the bottom of the precipitation vessel, and is discharged from the vessel through a pipe (20).

A suitable size, shape, width and height of the precipitation vessel (12) may be selected to ensure that the drops and particles, which are ejected from the atomizer, remain in the gaseous space (34') of the precipitation vessel for an optimal dwell time. For example, increasing the height of the precipitation vessel (12), making it tower-like, increases the dwell time of the fibre composition.

Processes in the precipitation reactor (10) may also be regulated by adjusting, for example, the number of rings, the distance between the rings, the distance between the blades on each ring, and the blade dimension and position, in the atomizer.

The pigment composition which is discharged through the bottom of the precipitation vessel (12) can be re-circulated back to the same precipitation reactor, or be fed to another reactor, to finish the treatment.

FIGS. 4 and 5, which illustrate another precipitation reactor according to the present invention with its atomizer, use the same reference numbers as presented in FIGS. 1 and 2, when applicable. According to the invention, another precipitation reactor (10), presented in FIG. 4, differs from the device presented in FIGS. 2 and 3 mainly in that the reactor comprises a atomizer (14) equipped with a closed outer ring, and in that the precipitation reactor does not include a separate precipitation area extending beyond the atomizer. The solution presented in FIGS. 4 and 5 is suitable to be used, for example, when the precipitation reactions are assumed to be completed in the desired manner already in the gaseous space of the atomizer.

In the atomizer presented in FIGS. 4 and 5, the outermost ring (28') is surrounded by a housing (40) which seals the ring. The housing comprises a discharge opening (42) for discharging the treated fibre composition from the device (14). The treated fibre composition may be directed from the discharge opening (42) through a pipe for further treatment or further processing. As shown in FIG. 4, the material discharged from the precipitation reactor may also be re-circulated back to the same reactor or directed to another reactor, to finish the carbonation.

Two or more of both types of precipitation reactors presented in FIGS. 2 and 4 can be arranged in a sequential series. FIG. 6 illustrates a group of three precipitation reactors arranged in a sequential series. The first reactor is of the type presented in FIG. 4 and the next two reactors are of the type presented in FIG. 2. When applicable, the reference numbers are the same as in the previous diagrams.

FIG. 6 illustrates three precipitation reactors 10, 10' and 10", where the calcium hydroxide-bearing aqueous slurry which comprises titanium dioxide particles is treated with $CO_2$ gas for carbonating $Ca^{2+}$ ions, i.e. to precipitate $CaCO_3$. The calcium hydroxide-bearing aqueous slurry which comprises titanium dioxide particles is directed through a pipe at the top into the first precipitation reactor (10), into which carbon dioxide-bearing gas, too, is directed via a pipe (18). The partly carbonated pigment composition is directed via the break tank (48) into the second precipitation reactor (10'). Into the aqueous slurry to be treated, calcium hydroxide which is to be precipitated may be added through the pipe (52) as well, after the first precipitation reactor.

From the break tank (48), the partly treated aqueous slurry, which comprises pigment composition and unprecipitated calcium hydroxide, is directed through the discharge pipe to the feed pipe (16) of the second reactor (10'), and is thereafter directed via the bottom to the atomizer (14) of the second precipitation reactor. The precipitating gas (18'), typically carbon dioxide, is directed together with the pigment composition to the device (14). Correspondingly, the pigment composition which has been treated in the second reactor (10') and the aqueous slurry which comprises unprecipitated calcium hydroxide are directed through the discharge pipe (20') to the feed pipe (16') of the third reactor (10"). From the bottom of the third reactor (10"), mainly previously treated pigment composition, in which the weight ratio between the titanium dioxide and the calcium carbonate is predetermined, is removed by way of a pipe (20").

It is possible to add calcium hydroxide or calcium carbonate at any stage of the process, before the finishing of the pigment composition in the last reactor. The average size of the bound calcium carbonate particles can be affected by additions of calcium hydroxide. Titanium dioxide, too, can be added at any stage of the process, before the finishing of the pigment composition in the last reactor, in order to achieve a desired weight ratio between the titanium dioxide and the calcium carbonate.

Carbon dioxide-bearing gas is led to each reactor through the pipes 18, 18', 18". Carbon dioxide-bearing gas is fed through the feed pipe 18 to the first reactor 10, which induces precipitation (carbonisation). The calcium carbonate particles which are generated precipitate on the titanium dioxide particles and, to some degree, the calcium carbonate particles precipitate on each other, too. It is possible to direct the same or another carbon dioxide-bearing gas to the second and the third precipitation reactors 10', 10" through pipes 18', 18" in order to complete the precipitation reactions (carbonisation). Gas is removed from the reactors through discharge pipes 21, 21', 21" Typically the gas to be removed comprises steam and carbon dioxide. The gas is directed for treatment in a gas-washing and cooling device (54). In the device (54), the treated carbon dioxide-bearing gas is re-circulated back to the precipitation reactors.

The manufactured compositions are suitable for several applications in which traditional pigments such as titanium dioxide are used today. To mention a few examples:

- Paint compositions which comprise pigment and binder, and conventional manufacturing materials and additives used in paints
- Coating material compositions which comprise pigment and binder, and conventional manufacturing materials and additives used in coating materials
- Filler compositions which comprise pigment, and conventional manufacturing materials and additives used in filler compositions
- Polymer compositions which comprise thermoplastic polymer, in which pigment and possibly conventional manufacturing materials and additives used in polymer composition, are mixed, and
- Printing ink compositions which comprise pigment mixed in a liquid phase, binder and possibly colour pigment and other manufacturing materials and additives used in printing ink compositions.

In all of these, at least 1 weight-%, most suitably at least 5 weight-%, especially approximately 20 weight-% of the pigment comprises a calcium carbonate-pigment aggregate according to any of the applications described above.

The following non-limiting examples illustrate the present invention.

Example 1

Manufacturing of a Pigment Particle Composition

Raw Materials Used in the Tests
1. $Ca(OH)_2$ aqueous slurry, the dry matter content of which was approximately 17%, T=60° C.
2. Commercial titanium dioxide elutriated in approximately 50% dry matter, T=20° C.
3. $CO_2$ bearing gas, T=20° C.

Figure 6:
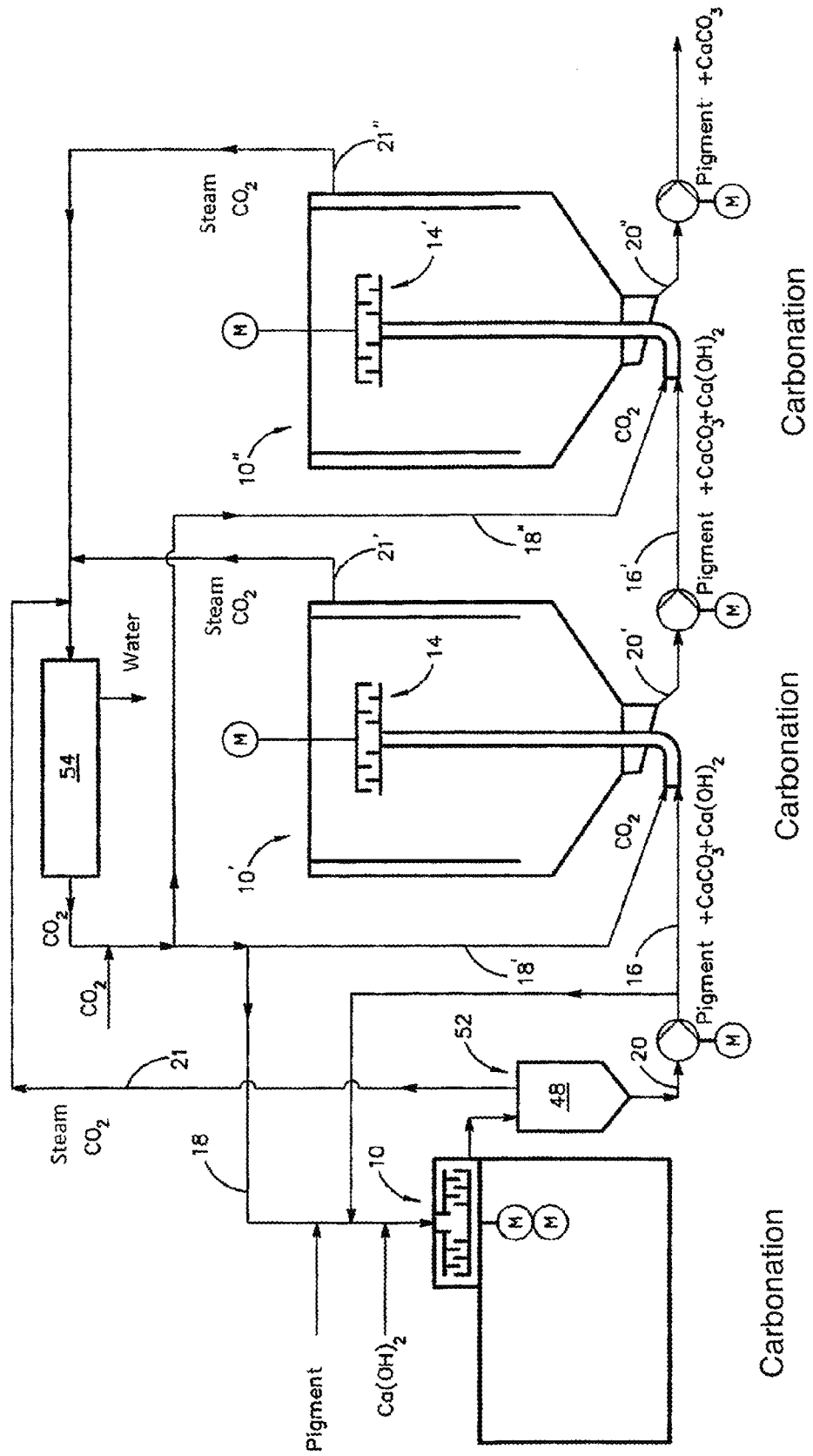
FIG. 6 shows schematically, as an example, a vertical cross-section of the group of the precipitation reactors according to the present invention.

With the method according to the present invention, a pigment particle composition was prepared by feeding a needed amount of $Ca(OH)_2$ slurry and a titanium dioxide slurry into a group of precipitation reactors, shown in FIG. 6, with the purpose of generating a titanium dioxide/PCC mass ratio of 30/70 after the precipitation. A surplus of carbon dioxide-bearing gas, too, was fed into the precipitation reactors. The titanium calcium hydroxide-bearing aqueous slurry which comprises titanium dioxide particles was broken up into small drops in the carbon dioxide-bearing gas by directing the slurry through a high energy mixing zone.

The partly treated pigment composition was pumped from the first precipitation reactor into the second precipitation reactor and, furthermore, from there into the third precipitation reactor, from which a pigment particle composition according to the present invention was obtained, having a dry matter percentage of 24% and at a temperature of 65° C. The pH of the pigment composition after the third precipitation reactor was 6.9, i.e. essentially all of the $Ca(OH)_2$ had been precipitated into calcium carbonate. The calcium carbonate percentage of the pigment composition was determined by titration. The result was 69.9%, as desired.

Example 2

With the method according to the present invention, a pigment composition was prepared in which the mass ratio between the titanium dioxide and the calcium carbonate was 18/82. The dry matter content of the composition was increased to 60% and a dispersant was added into it, thereby obtaining a very fluid pigment slurry. With this product, a fully matt and much filled (PVC>70%) primer was prepared in such a way that no other component was changed, except that 50 parts per weight of the titanium dioxide were substituted by an equivalent amount of the pigment composition according to the present invention (calculated as dry per dry).

Titanium dioxide accounted for 8.0 weight-% of the reference paint.

The test point comprised 4.0 weight-% of titanium dioxide and 4.0 weight-% of the pigment composition according to the present invention. The covering powers of the paints prepared in this way were measured, and the following results were obtained:

| | |
|---|---|
| Reference | 96.3% |
| Test point | 96.2% |

Example 3

Water was removed from the pigment composition according to example 1 by using a centrifuge, and a dispersant was added thereby obtaining a very fluid pigment slurry, the dry matter content of which was 60%. This product was used to substitute for titanium dioxide, which is used for coating cardboard, in such a way that no other component of the coating paste was affected. The reference paste comprised 4 parts of titanium dioxide and 96 parts of ground calcium carbonate. In the test point 1, half of the titanium dioxide and in test point 2, all of the titanium dioxide was substituted by the pigment composition according to the present invention. The paste was applied 12 $g/m^2$ on the cardboard. The layer of coating was removed from the final cardboard by dissolving and the opacity of the cardboard was then measured. The following results were obtained:

| | |
|---|---|
| Reference | 78.4% |
| Test point 1 | 78.3% |
| Test point 2 | 78.6% |

Example 4

The titanium dioxide which is used as a filler in paper was substituted by a pigment composition according to the present invention in such a way that no other component which is used in paper production was modified As a second reference, some paper was prepared by using a mixture of titanium dioxide and scalenohedric commercial PCC as fillers, the ratio being the same as between the titanium dioxide and calcium carbonate in the product according to the present invention, i.e. 30/70. The grammage of the paper was 60 $g/m^2$ and the filler percentage 10%. The opacity of a paper sheet prepared in this way was measured, and the following results were obtained:

| Reference 1 | 85.5% |
| Reference 2 | 83.8% |
| Test point 1 | 85.7% |

The present invention is not to be restricted to the explanations and examples above. Instead, it is intended that the present invention be widely applied within the limits determined in the claims presented below.

What is claimed is:

1. A pigment particle composition which comprises calcium carbonate particles and pigment particles, wherein the calcium carbonate particles are non-spherical in form and wherein at least part of the calcium carbonate particles are carbonated so that they bind to each other to form calcium carbonate structures which comprise at least one pigment particle, wherein the calcium carbonate particles are in the crystalline form of calcite or aragonite and are in external form rhombic or rhombohedric, and form a shell that at least partially encases the at least one pigment particle and together with the pigment particles, form pigment-calcium carbonate aggregates which comprise at least two pigment particles and which have an opacity of the same magnitude as the pigment, wherein the weight ratio between the pigment particles and the calcium carbonate particles is approximately 90:10 . . . 5:95 and wherein more than 50 weight % of the pigment particles remain attached to the calcium carbonate particles when said pigment particle composition is dispersed in water and dried.

2. The composition according to claim 1 wherein the calcium carbonate particles form a polynuclear calcium carbonate structure, to which a pigment particle is attached.

3. The composition according to claim 1, wherein calcium carbonate crystals are attached to more than 95% of the pigment particles, in such a way that in more than 95% of instances, the calcium carbonate crystals remain attached, both in the dry pigment composition and in the aqueous slurry of the pigment composition.

4. The composition according to claim 1, wherein the shell formed of the calcium carbonate particles encases, partly or totally, approximately 2-20 pigment particles.

5. The composition according to claim 1, wherein the calcium carbonate structure is formed of calcium carbonate particles, the average size of which is approximately 20-250 nm.

6. The composition according to claim 1, wherein the pigment composition comprises other components selected from the group consisting of dispersants, surface-modifying agents and stabilising agents or mixtures thereof.

7. The composition according to claim 1, manufactured
by atomizing a calcium hydroxide-bearing aqueous slurry which comprises pigment particles into carbon dioxide-bearing gas, in order to carbonate the calcium hydroxide to generate calcium carbonate, and in turn to generate a pigment composition, and
by choosing the amount of the calcium hydroxide in the aqueous slurry in such a way that the percentage of calcium carbonate in the pigment composition is equivalent to a predefined weight percentage.

8. The composition according to claim 1, wherein the weight ratio between the pigment particles and the calcium carbonate is adjusted to the desired ratio by choosing the amount of the calcium hydroxide and the amount of the calcium carbonate in the aqueous slurry in such a way that the percentage of the calcium carbonate in the final pigment composition corresponds to a predefined weight percentage.

9. The composition according to claim 7, wherein the calcium hydroxide-bearing aqueous slurry which comprises pigment particles is directed through a high energy mixing zone, in which zone the aqueous slurry is broken up into drops or even into nebulous drops, and then dripped into a carbon dioxide-bearing gas.

10. The composition according to claim 7, wherein the carbonation reaction is continued until essentially all of the calcium hydroxide has been converted into calcium carbonate.

11. The composition according to claim 9, wherein the calcium hydroxide-bearing aqueous slurry of the pigment particles is at least essentially free of fibres.

12. The composition according to claim 1, wherein the pigments are light-scattering and/or absorbing pigments selected from the group consisting of titanium dioxide, aluminium hydroxide, barium sulphate, kaolin, gypsum, ground or precipitated calcium carbonate, chalk, plastic pigments, furnace black, or mixtures thereof.

13. The composition according to claim 1, wherein the pigment particles are titanium oxide and the opacity of the composition at weight ratios of 10:90 . . . 30:70 between titanium dioxide and calcium carbonate, is at least as good as 100% titanium dioxide.

14. The composition according to claim 1, wherein the crystalline form of the titanium dioxide which is used as the pigment particles is rutile or anatase.

15. The composition according to claim 1, wherein the pigment particles are separated from each other by the calcium carbonate structures in such a way that the distance between them is on average at least approximately 60 nm.

16. The composition according to claim 1, wherein the thickness of the shell formed by the calcium carbonate structures is on average at least approximately 30 nm.

* * * * *